Jan. 5, 1943.   F. M. CLARK   2,307,488
ELECTRIC CAPACITOR
Filed May 3, 1938
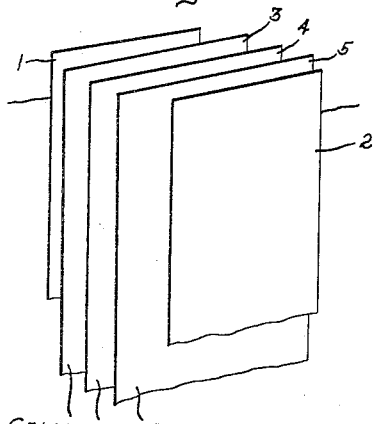
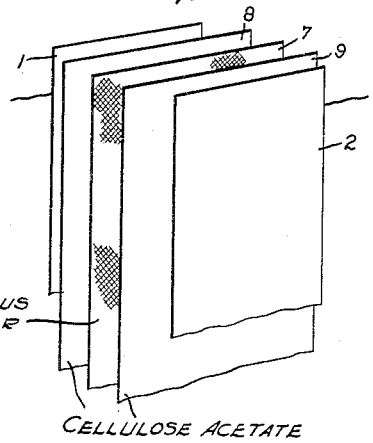
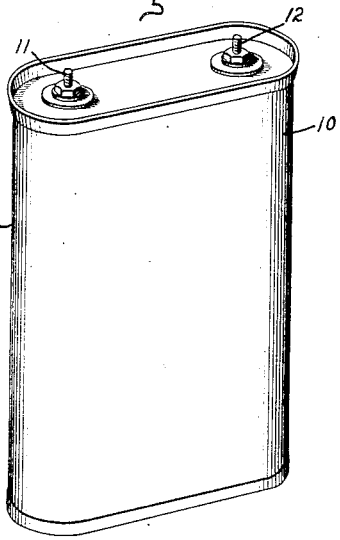
Inventor:
Frank M. Clark,
by Harry E. Dunham
His Attorney.

Patented Jan. 5, 1943

2,307,488

UNITED STATES PATENT OFFICE 2,307,488

ELECTRIC CAPACITOR

Frank M. Clark, Pittsfield, Mass., assignor to General Electric Company, a corporation of New York Application May 3, 1938, Serial No. 205,747

9 Claims. (Cl. 175—41)

The present invention relates to electric capacitors (condensers), and its object is to provide improvements whereby the electric capacity of capacitor units of given cubical size will be increased, or, conversely, whereby capacitors of predetermined rating may be made smaller in size.

The improved capacitors embodying my present invention are provided with dielectric or spacing material comprising one or more sheets of cellulose acetate, or other equivalent cellulose ester compound, which have a thickness less than .0003", and which have associated therewith a halogenated (preferably chlorinated) aromatic hydrocarbon compound, such, for example, as a chlorine compound of diphenyl, diphenyl ketone, diphenyl methane or ethane, phenyl benzoate, benzene and/or the derivatives of such compounds, as for example, the pentachlor nitrodiphenyl or the alkyl derivatives, such as the chlorinated methyl or ethyl benzenes. Such compounds, which have dielectric constants at least as high as about 3 (and more often 5, or higher) possess the double function of preserving the cellulosic members and improving the dielectric efficiency of capacitors containing them.

In the many fields of use for dielectric capacitors, a reduction of physical bulk per unit of microfarad electrical capacity has been sought by engineers and inventors. Such fields include starting and power factor correction capacitors for electric motors, capacitors for fluorescent lamps, capacitors for neon signs, ignition capacitors, and radio reception capacitors. Heretofore it has been attempted to obtain the desired reduction in physical size or bulk by constructing capacitors with materials having higher dielectric constants. The utility of such materials are limited, however, by the increased power losses which appear to be inherent. If the dielectric constant is higher than approximately 5, the power losses become more pronounced when the operating temperatures become as high as 75° C., or higher. The problem is made more acute due to the fact that a reduced bulk per microfarad gives less surface from which heat can be dissipated.

Another means by which the dielectric capacity of a capacitor can be increased, while still retaining low loss and efficient operation, is reduced thickness of the dielectric element between the armatures. Here again difficulties heretofore have barred the way. Because of the presence of conducting particles in all solid sheet materials, the construction of capacitors with a single sheet of spacing material has led to low dielectric strength and short life. Paper tissue customarily used as a spacer in dielectric capacitors is not suitable for practical use when it has a thickness less than about .0003".

It has been attempted to utilize thin films of varnishes and resins applied to the electrode surfaces. Such thin films have been unsatisfactory because of their inability to coat properly the sharp edges of the foil electrodes which ordinarily are of a thickness ranging from .0003" to .0005". Armatures of thicker foil contribute to increased capacitor bulk. Uncoated edges result in short circuit between armatures or unsuitably low dielectric strength.

Cellulose acetate sheet material has been suggested for dielectric purposes in capacitors. Attempts to use cellulose acetate sheets, however, have been unsuccessful because the thickness of such material in sheet form heretofore has exceeded the thickness of available paper, and, in fact, has been of the order of .0008". Cellulose acetate, unless plasticized, has inferior physical properties, such as brittleness, which makes the material unsuited for capacitor construction. For example, brittle material does not withstand the bending around sharp radii which is demanded in the most practical and efficient forms of capacitors. Cellulose acetate, for example, becomes embrittled during the high temperature vacuum-drying treatment of the capacitor which is required as the presence of water in capacitors results in higher power losses and hence reacts against the success of such a capacitor, particularly under operating condition as high as 75° C., or higher. If the capacitors are impregnated with mineral oil the embrittlement of the cellulose compound becomes even more pronounced and endangers the useful life of the capacitors. The plasticizers heretofore used for cellulose acetate and the like, such, for example, as tributyl phosphate, dibutyl phthalate, or acetamide, have resulted in sheet products of high energy loss characteristics which in capacitors leads to overheating and failure.

I have found that when capacitors are constructed with dielectric elements comprising one or more sheets of cellulose acetate, or equivalent cellulosic compound, having thicknesses within a range of .0003" down to .0001", or even lower, and that when such sheets are coated with or wetted by a liquid material, such as pentachlor diphenyl, or equivalent chlorinated aromatic (aryl) compound having a good dielectric constant, as above indicated, that preservation of the physical properties of the sheet material, lower power losses and high electric capacities result. As a consequence, the physical bulk per microfarad is reduced without the objectionable features heretofore considered unavoidable. Pentachlor diphenyl, in addition to having a dielectric constant higher than mineral oil, plasticizes the embrittled cellulosic product, restoring and maintaining the flexibility of the film throughout the life of the capacitor.

The accompanying drawing shows diagrammatically in Fig. 1 an assembly of capacitor elements embodying my invention; Fig. 2 illustrates similarly a modification; and Fig. 3 shows in side elevation a finished capacitor sealed in a metal container.

Continuous films of cellulose esters, as used in my novel capacitor, preferably are prepared from acetone solutions. I prefer, also, to use cellulose acetate which has been acetylated to from 38 to 39.4 per cent, although cellulose acetylated to as high as 41 per cent can be of some utility. A preferred cellulose acetate solution is made up in the following proportions:

|  | Per cent |
|---|---|
| Cellulose acetate | 5.75 |
| Ethylene glycol monoethyl ether | 6.00 |
| Acetone | 88.25 |

The ethylene glycol monoethyl ether is used in order to prevent "blushing" of the acetate film on drying. The dielectric sheet is prepared by depositing the film on a continuous belt passed through the solution of the cellulose compound, dried at a suitably high temperature and stripped from the belt, after which it is wound into rolls and slit to the desired width. Films are prepared to have a thickness ranging from .0003" to as thin as .0001", or thinner.

It is preferred in the construction of my novel capacitor to use sheets of cellulose acetate as thin as .0002", or thinner. In like manner, sheets of other cellulosic derivatives may be used for the purpose of my invention, as for example, ethyl cellulose, butyl cellulose and cellulose nitrate, as well as double esters such as butyl ethyl cellulose and cellulose stearate-acetate.

As shown in Fig. 1, the capacitor assembly includes armatures 1, 2 which may consist of strips of aluminum foil having therebetween three thin sheets 3, 4, and 5 of cellulosic compound prepared as above described. As shown, the sheets 3, 4, 5 are somewhat wider than the armature strips.

Capacitors embodying my invention are characterized by exceptionally high dielectric strength. Sheets of cellulose acetate as thin as .0001" are characterized by a dielectric strength of 2500 volts per mil. A dielectric strength of about 600 volts per mil is characteristic of the usual capacitor linen or kraft paper tissue in thicknesses of .0003" to .0005".

After assembly and drying under a vacuum at about 100° C., in accordance with known practice, the capacitor units are impregnated at about 100° C. with the selected chlorinated aromatic hydrocarbon. Pentachlor diphenyl is a preferred type of impregnant and possesses a dielectric constant of about 5, in addition to low dielectric loss characteristics. Pentachlor diphenyl or similar impregnant fills voids in the capacitor, displacing the low dielectric constant air films and pockets between sheets of the cellulose acetate, or other equivalent material and between such sheets and the armatures. Chlorinated aryl hydrocarbons, such as pentachlor diphenyl, restore plasticity to the embrittled cellulosic derivative film caused by the drying treatment necessary to eliminate the water, and constitutes the sole plasticizing agent for said sheets.

Because of the non-porous nature of the cellulosic compound sheets, it is desirable to impregnate the capacitors loosely wound in order to obtain complete penetration of the chlorinated compound between the dielectric sheets with consequent elimination of all voids or gas pockets which lower the dielectric strength of the capacitor.

Since it is desirable and often necessary from the nature of the capacitor winding that complete impregnation of the wound assembly be quickly and easily obtained, one or more sheets of cellulose compound may be used with one or more sheets of thin capacitor paper. The paper may be interspaced between sheets or groups of sheets of the cellulosic compound films. Thus, for example, as shown in Fig. 2, a sheet of porous paper 7, having a thickness of .0003", can be placed between two sheets 8, 9 of cellulose acetate of a thickness not exceeding .0002". The paper, which may consist of kraft tissue, functions as a wick to assist in the complete air and void displacement by the impregnant. Such an assembly, while not giving the smallest possible physical bulk per microfarad capacity, gives a reduction in physical size equal to about 33 per cent of the smallest possible size obtainable with three sheets of the thinnest capacitor paper available. The capacitor assemblies of rolled-up armatures and interposed dielectric material may be cylindrical in shape but preferably are given a flattened, roughly elliptical shape. In Fig. 3 is shown a completed rolled unit mounted in a container 10, the armatures (not shown) being connected to external terminals 11, 12. Stacked combinations of armatures and dielectric in the form of flat packs may be used under some circumstances.

For 220 to 330 volts alternating-current capacitors, it has been customary to use three sheets of .0003" kraft paper when the smallest physical bulk per microfarad is demanded. Such capacitors, when impregnated with pentachlor diphenyl, have an electrical capacity of 2.26 cu. in. per microfarad. When, however, three sheets of cellulose acetate constitute the dielectric spacer, each sheet having a thickness of .0002", the assembly also being impregnated with the pentachlor diphenyl, then the physical bulk is reduced to 1.35 cu. in. per microfarad. This is a reduction in physical size equal to about 40 per cent. Greater reduction in physical size per microfarad is possible by the use of thinner sheets of the acetate. Thus, with sheets as thin as .0001", the reduction in size per microfarad amounts to about 60 per cent.

My improved capacitors are characterized by a power factor of less than .5 per cent taken at room temperature and at 60 cycles impressed alternating current. Unexpectedly the power factor decreases with temperature rise. Thus, at 75° C., which is in the higher temperature range of operation, the power factor is only .44 per cent. Even at 100° C., the power factor is not higher than the room temperature value. This is of importance, and vital in the operation of small-sized capacitors of high electrical capacity which are usually operated in locations not adapted for efficient cooling, and under conditions in which higher loss capacitors will overheat and fail dielectrically.

What I claim as new and desire to secure by Letters Patent of the United States is:

1. An electric capacitor comprising cooperating armatures, a plurality of interposed dielectric sheets consisting of a cellulose derivative, said sheets having a thickness of about .0001 to .0002 inch, and liquid chlorinated diphenyl coating said sheets and filling voids in said capacitor, thereby preserving the cellulose compound, and increasing the capacity of said capacitor.

2. An electric capacitor comprising cooperating armatures, an interposed dielectric layer comprising one or more sheets of cellulose acetate having each a thickness less than .0003 inch, a sheet of porous paper having a thickness not substantially exceeding about .0003 inch, and liquid chlorinated diphenyl coating said sheets and filling voids in said paper thereby preserving said cellulose acetate and improving the electric capacity of said capacitor.

3. An electric capacitor comprising cooperating armatures, an interposed dielectric layer comprising two sheets of cellulose acetate having each a thickness of about .0001 to .0002 inch, a sheet of porous kraft tissue interposed between said acetate sheets, and liquid chlorinated diphenyl filling voids in said capacitor.

4. An electric capacitor comprising cooperating armatures, a dielectric layer therebetween including sheets of cellulose acetate which have about 38 to 41 per cent of acetylation and have a thickness of about .0001 to .0002 inch, and liquid chlorinated diphenyl coating said sheets and filling voids in said capacitor.

5. A capacitor dielectric element comprising a non-porous sheet of cellulose acetate having a thickness of about .0001 to .0002 inch, said sheet being coated with a film of chlorinated aromatic compound.

6. An electric capacitor dielectric element comprising cellulose acetate in sheet form having a thickness not exceeding .0003 inch and a film of liquid chlorinated diphenyl coating said sheet.

7. A capacitor dielectric element comprising a non-porous sheet of cellulose acetate having about 38 to 41 per cent acetylation and a thickness of about .0001 to .0002 inch, said sheet being coated with a film of liquid chlorinated diphenyl.

8. An electric capacitor comprising cooperating armatures, an interposed dielectric layer comprising one or more sheets of cellulose acetate having each a thickness less than .0003 inch, a separate sheet of porous paper having a thickness not substantially exceeding about .0003 inch interleaved between said cellulose acetate sheets, and liquid chlorinated diphenyl coating said sheets and filling voids in said paper thereby preserving said cellulose acetate and improving the electric capacity of said capacitor.

9. An electric capacitor comprising cooperating armatures, an interposed dielectric layer comprising two sheets of cellulose acetate having each a thickness of about .0001 to .0002 inch, a separate sheet of porous kraft tissue interposed between said acetate sheets, and liquid chlorinated diphenyl filling voids in said capacitor.

FRANK M. CLARK.